United States Patent
Wada et al.

(10) Patent No.: US 10,948,236 B2
(45) Date of Patent: Mar. 16, 2021

(54) HEAT EXCHANGER AND WATER HEATER INCLUDING SAME

(71) Applicant: NORITZ CORPORATION, Hyogo (JP)

(72) Inventors: Norihide Wada, Kobe (JP); Takeshi Ohigashi, Kobe (JP); Nobuhiro Takeda, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 58 days.

(21) Appl. No.: 16/418,324

(22) Filed: May 21, 2019

(65) Prior Publication Data
US 2019/0368818 A1    Dec. 5, 2019

(30) Foreign Application Priority Data

May 29, 2018  (JP) .............................. JP2018-102279

(51) Int. Cl.
  *F28D 1/047*  (2006.01)
  *F28F 9/013*  (2006.01)
  *F28F 3/02*   (2006.01)
(52) U.S. Cl.
  CPC .............. *F28D 1/0477* (2013.01); *F28F 3/02* (2013.01); *F28F 9/013* (2013.01); *F28F 2210/10* (2013.01)
(58) Field of Classification Search
  CPC .................................................... F28D 1/0477
  See application file for complete search history.

(56) References Cited

U.S. PATENT DOCUMENTS

| | | | | |
|---|---|---|---|---|
| 879,502 A | * | 2/1908 | Oosterwyck | F22B 21/34 122/235.19 |
| 1,995,167 A | * | 3/1935 | Battles | F25B 39/02 62/521 |
| 2,171,369 A | * | 8/1939 | Nathan | F24D 3/087 165/163 |

(Continued)

FOREIGN PATENT DOCUMENTS

JP        5306909 B2    10/2013

*Primary Examiner* — Nathaniel Herzfeld
(74) *Attorney, Agent, or Firm* — Studebaker & Brackett PC

(57) ABSTRACT

A heat exchanger includes a plurality of serpentine or U-shaped first heat transfer tubes disposed in a case and formed by connecting a plurality of straight tube body portions, which are arranged at intervals in an up-down height direction so as to extend in a horizontal direction, in series via a first connecting tube body portion, upper side and lower side header portions connected to respective end portions of the plurality of first heat transfer tubes, and a second heat transfer tube disposed in the case so that upper side and lower side end portions thereof are connected respectively to the upper side and lower side header portions and configured such that an intermediate region, which excludes at least the respective end portions and a region of an uppermost portion that is adjacent to the upper side end portion, is constituted by tube body portions that are tilted over the entire length thereof so as to gradually decrease in height from one end side toward another end side of the intermediate region. As a result, a malfunction in which a hot water supply operation becomes difficult due to freezing of the heat transfer tubes can be prevented appropriately.

9 Claims, 4 Drawing Sheets

(56) References Cited

U.S. PATENT DOCUMENTS

| | | | | | |
|---|---|---|---|---|---|
| 2,200,156 | A | * | 5/1940 | Cassidy | F22B 17/105 |
| | | | | | 122/355 |
| 3,428,119 | A | * | 2/1969 | Pouderoux | F28F 9/26 |
| | | | | | 165/154 |
| 4,993,368 | A | * | 2/1991 | Jones | F22B 21/24 |
| | | | | | 122/235.23 |
| 7,137,360 | B1 | * | 11/2006 | Zorzit | F22B 13/04 |
| | | | | | 122/235.11 |
| 7,464,671 | B2 | * | 12/2008 | Harth, III | F22B 37/202 |
| | | | | | 122/510 |
| 7,571,760 | B2 | * | 8/2009 | Lee | F25B 39/04 |
| | | | | | 165/150 |
| 8,122,737 | B2 | * | 2/2012 | Nuiding | F28D 1/0477 |
| | | | | | 62/515 |
| 9,004,019 | B2 | * | 4/2015 | Huang | F28D 1/00 |
| | | | | | 122/235.23 |
| 2013/0112384 | A1 | * | 5/2013 | Naruse | F24H 9/146 |
| | | | | | 165/173 |

\* cited by examiner

HEAT EXCHANGER AND WATER HEATER INCLUDING SAME

BACKGROUND OF THE INVENTION

Field of the Invention

The present invention relates to a heat exchanger of a type that includes a heat transfer tube into which water is supplied, and a water heater such as a hot water supply device that includes the heat exchanger.

Description of the Related Art

Japanese Patent No. 5306909 describes an example of a heat exchanger.

The heat exchanger described in this patent is used as a constituent element of a water heater and is configured such that a plurality of serpentine heat transfer tubes are arranged inside a case into which combustion gas is supplied from a burner. Respective ends of each heat transfer tube are connected to a pair of headers used to take in water and discharge hot water, and water flowing into the heat transfer tubes through the water inlet header is heated by the combustion gas and then discharged as hot water after reaching the hot water outlet header.

In the above prior art, however, there remains room for improvement, as will be described below.

When the water heater is to be left unused for a long time, the water is often drained from the heat transfer tubes to prevent the water from freezing in winter. However, each of the heat transfer tubes of the heat exchanger are formed in a serpentine shape by connecting a plurality of straight tube body portions in series via connecting tube body portions, and the straight tube body portions are substantially horizontal. Therefore, when the water heater is installed in a non-tilted state, the water can be drained from the heat transfer tubes appropriately, but when the water heater is installed so as to be tilted forward, backward, or the like, it is difficult to drain the water appropriately, and as a result, water may remain in the heat transfer tubes and freeze in these parts. When freezing occurs in this manner, a trouble, in which the water does not flow through the heat transfer tubes even after a user opens a hot water supply terminal in order to start using the water heater, and as a result, hot water is not supplied to the hot water supply terminal, may occur.

CITATION LIST

Patent Literature 1: Japanese Patent No. 5306909

SUMMARY OF THE INVENTION

An object of the present invention is to provide a heat exchanger with which the problem described above can be prevented or suppressed appropriately, and a water heater including the heat exchanger.

To solve the problem described above, the present invention employs the following technical means.

A heat exchanger provided by a first aspect of the present invention includes a case into which heating gas is supplied, a plurality of serpentine or U-shaped first heat transfer tubes disposed in the case and formed by connecting a plurality of straight tube body portions that are arranged at intervals in an up-down height direction so as to extend in a horizontal direction, in series via at least one first connecting tube body portion, upper side and lower side header portions connected to respective upper and lower end portions of the plurality of first heat transfer tubes in a manner capable of charging water into and discharging hot water from the plurality of first heat transfer tubes, and a second heat transfer tube disposed in the case so that upper side and lower side end portions thereof are connected respectively to the upper side and lower side header portions and configured such that an intermediate region excluding at least the respective end portions and a region of an uppermost portion that is adjacent to the upper side end portion, is constituted by a tube body portion that are tilted over the entire length thereof so as to gradually decrease in height from one end side toward another end side of the intermediate region.

Preferably, the second heat transfer tube is formed in a serpentine shape or a sideways V shape in which a plurality of tilted straight tube body portions that are arranged at intervals in the up-down height direction and tilted in the up-down height direction are connected in series via at least one second connecting tube body portion.

Preferably, the second connecting tube body portion is either a bent tube body portion bent into an arc shape or a straight tube body portion that stands upright in the up-down height direction.

Preferably, the second heat transfer tube is shaped such that a region thereof excluding the respective end portions is entirely curved.

Preferably, the respective end portions of the second heat transfer tube are horizontal.

Preferably, the second heat transfer tube is vertically symmetrical.

Preferably, the case includes a pair of side wall portions positioned on respective sides of the plurality of first heat transfer tubes, and the heat exchanger according to the present invention includes a pair of second heat transfer tubes, each of which is positioned between one of the pair of side wall portions and the plurality of first heat transfer tubes, as the second heat transfer tube.

A water heater provided by a second aspect of the present invention includes the heat exchanger provided by the first aspect of the present invention.

The water heater according to the present invention preferably further includes a burner that supplies combustion gas into the case of the heat exchanger, wherein the combustion gas serves as the heating gas.

Other features and advantages of the present invention will become more apparent from the embodiment of the invention to be described below with reference to the attached figures.

DETAILED DESCRIPTION OF THE PREFERRED EMBODIMENTS

A preferred embodiment of the present invention will be described specifically below with reference to the figures.

Figure 1A:
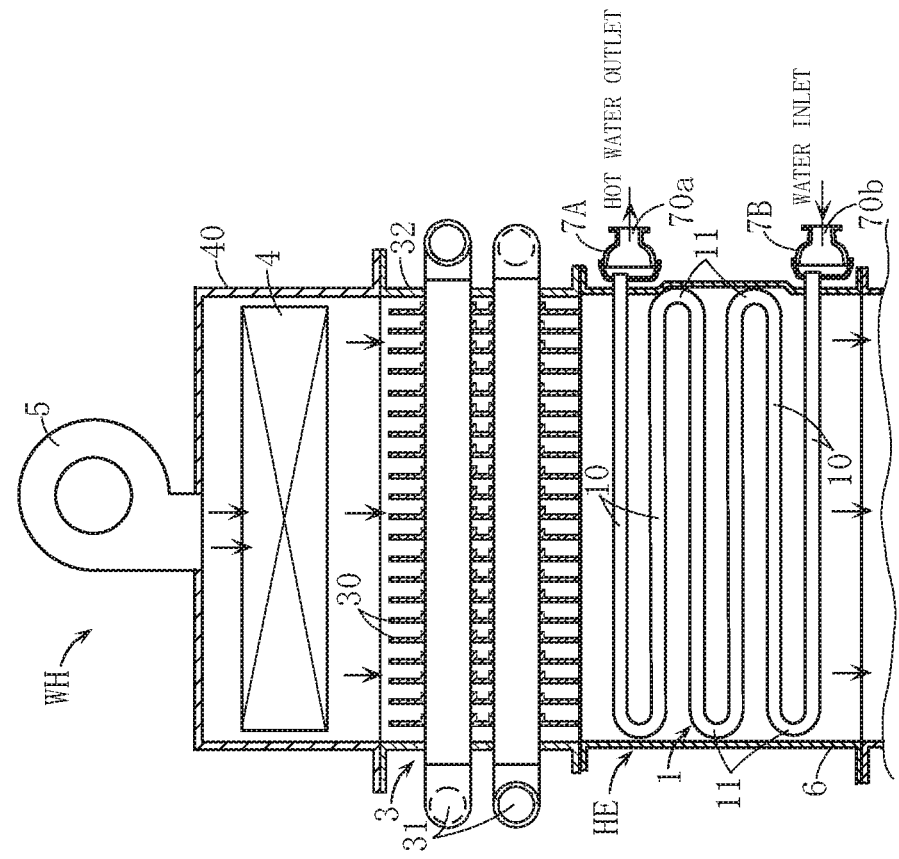
FIG. 1A is a sectional view showing main parts of an example of a water heater according to the present invention.
Figure 1B:
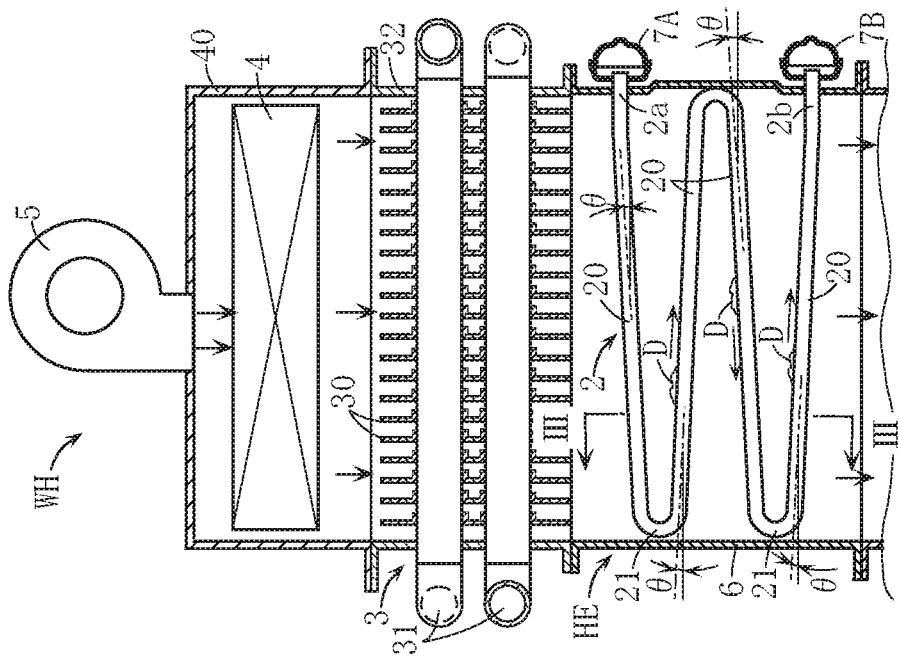
FIG. 1B is a sectional view showing main parts of another sectional location of the water heater shown in FIG. 1A.

A water heater WH shown in FIGS. 1A and 1B includes a burner 4 disposed in a burner case 40, a fan 5 for supplying combustion air into the burner case 40, and a primary heat exchanger 3 and a secondary heat exchanger HE disposed on a lower side of the burner case 40. The primary heat exchanger 3 is used to collect sensible heat from combustion gas (an example of heating gas) generated by the burner 4 and is configured, for example, by disposing a heat transfer tube 31 including a plurality of fins 30 inside a can body 32. The primary heat exchanger 3 according to this embodiment does not correspond to the heat exchanger to which the present invention is applied. The secondary heat exchanger HE is used to collect latent heat and corresponds to an example of the heat exchanger to which the present invention is applied.

The secondary heat exchanger HE includes a case 6 into which the combustion gas flows after passing through the primary heat exchanger 3, respective pluralities of first and second heat transfer tubes 1, 2 disposed in the case 6, and an up-down pair of header portions 7A, 7B.

Each first heat transfer tube 1 is a serpentine heat transfer tube including a plurality of straight tube body portions 10 arranged at intervals in an up-down height direction so as to extend in a horizontal direction, and a plurality of connecting tube body portions 11 (corresponding to an example of first connecting tube body portions) that are formed substantially in an arc shape when seen from the side and connected to the respective end portions of the plurality of straight tube body portions 10 so as to connect the plurality of straight tube body portions 10 in series. The plurality of first heat transfer tubes 1 are arranged at intervals in the horizontal direction (also see FIGS. 2 and 3), and in this embodiment, the plurality of first heat transfer tubes 1 are arranged in a staggered pattern so that a height difference exists between adjacent first heat transfer tubes 1. Upper and lower end portions of each first heat transfer tube 1 are drawn out to the exterior of the case 6 and connected to the header portions 7A, 7B. The header portions 7A, 7B are used to discharge hot water and to take in water, respectively, and respectively include a hot water outlet 70a and a water inlet 70b. Although not shown in the figures, water discharged through the hot water outlet 70a is conveyed to the heat transfer tube 31 of the primary heat exchanger 3.

Similarly to the first heat transfer tube 1, each second heat transfer tube 2 is a serpentine heat transfer tube. However, tube body portions 20 arranged at intervals in the up-down height direction are constituted by a plurality of tilted straight tube body portions 20 that are tilted at an appropriate angle θ relative to the up-down height direction, and the plurality of tilted straight tube body portions 20 are connected in series via connecting tube body portions 21 (corresponding to an example of second connecting tube body portions) that are formed substantially in a semicircular arc shape when seen from the side. Upper side and lower side end portions 2a, 2b of each second heat transfer tube 2 are formed from short-sized horizontal straight tube body portions. The respective end portions 2a, 2b are preferably formed from horizontal straight tube body portions in order to simplify an operation for passing the end portions 2a, 2b through a front wall portion of the case 6 and attaching the header portions 7A, 7B thereto.

Figure 2:
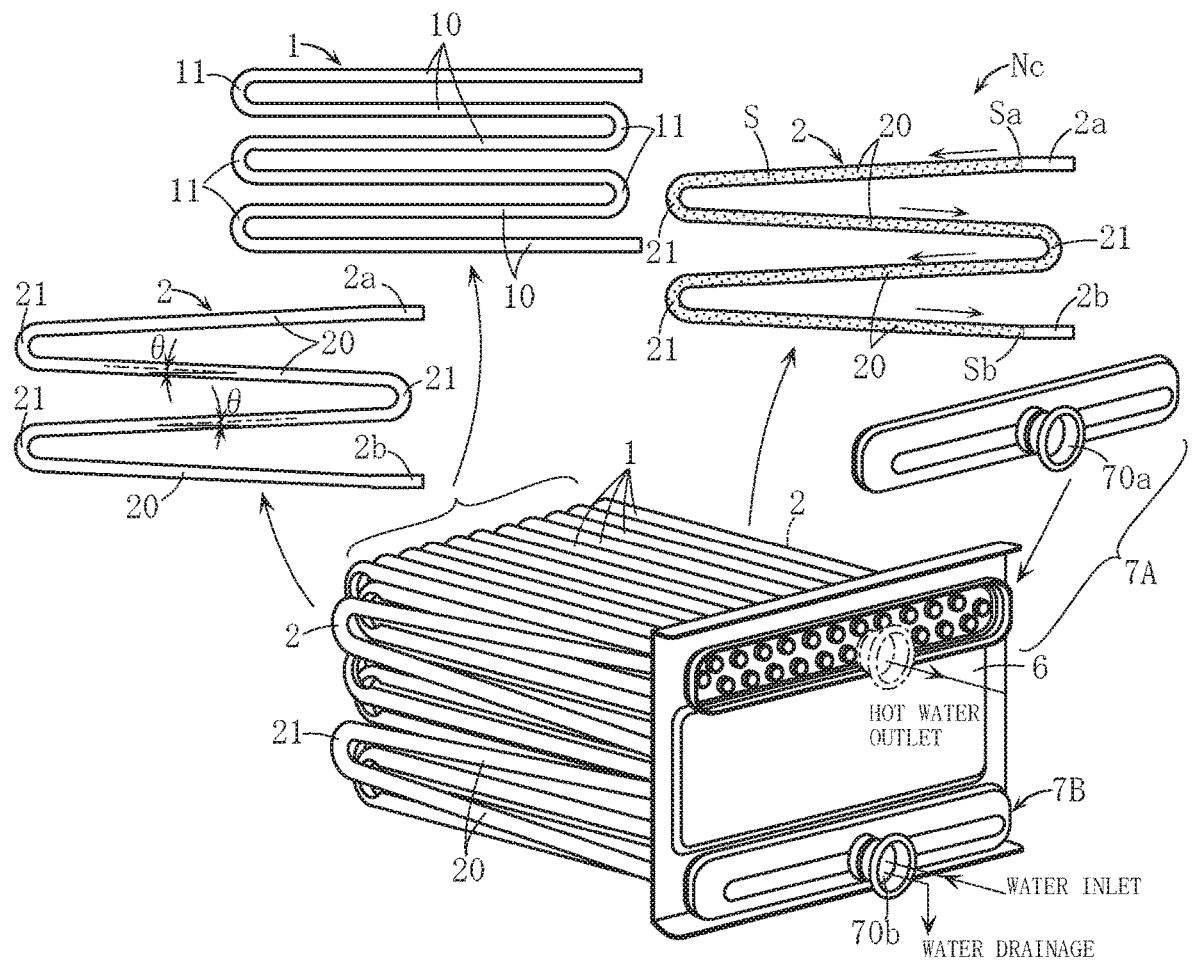
FIG. 2 is an illustrative view showing main parts of a heat exchanger used in the water heater shown in FIGS. 1A and 1B.

As illustrated by the second heat transfer tube 2 serving as a representative example, indicated by an arrow Nc in FIG. 2, an intermediate region S (the part indicated by the dotted pattern) of each second heat transfer tube 2, which excludes the respective end portions 2a, 2b, is constituted by tube body portions that are tilted over the entire length thereof so as to gradually decrease in height from one end Sa side toward another end Sb side of the intermediate region S.

Each second heat transfer tube 2 is preferably formed to be vertically symmetrical so that the second heat transfer tube 2 can be mounted in the case 6 either way up, thereby simplifying the mounting operation. Numbers of the tilted straight tube body portions 20 and connecting tube body portions 21 are set to be smaller than numbers of the straight tube body portions 10 and connecting tube body portions 11 of the first heat transfer tube 1. In so doing, the tilt angle θ of the tilted straight tube body portion 20 can be increased.

Figure 3:
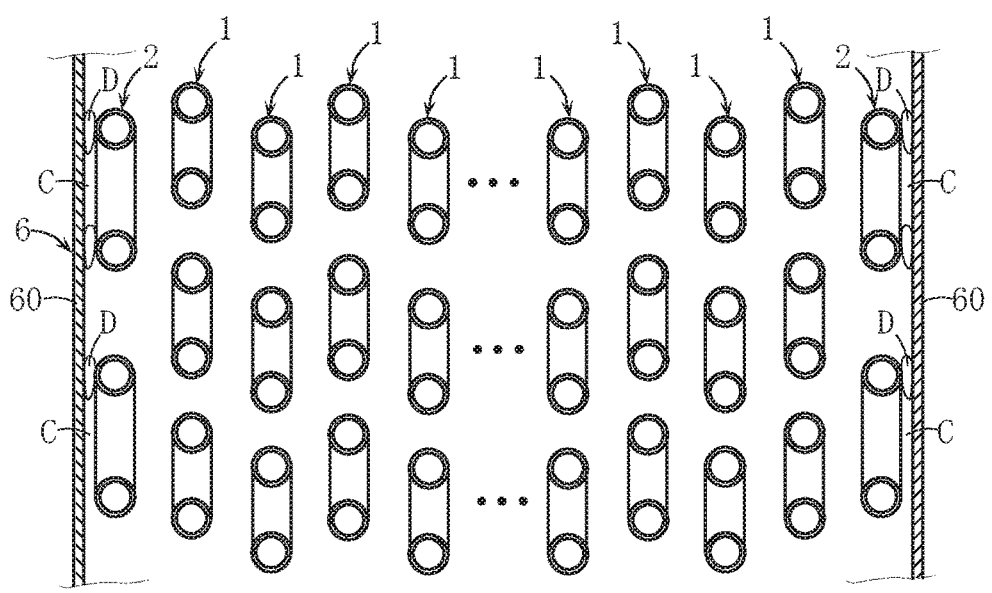
FIG. 3 is an III-III sectional view of FIG. 1A.

As shown in FIG. 2, the second heat transfer tubes 2 are provided in a left-right pair, for example, and the pair of second heat transfer tubes 2 are mounted in the case 6 so as to be positioned on the left and right sides of the plurality of first heat transfer tubes 1. As shown in FIG. 3, each second heat transfer tube 2 is positioned between the first heat transfer tubes 1 and a side wall portion 60 of the case 6, and in order to improve the thermal efficiency, each second heat transfer tube 2 is preferably disposed close to the side wall portion 60 of the case 6 so as to reduce the width of a gap C formed between the second heat transfer tube 2 and the side wall portion 60. The respective end portions 2a, 2b of each second heat transfer tube 2, similarly to the upper and lower end portions of the first heat transfer tube 1, are drawn out to the exterior of the case 6 and connected to the header portions 7A, 7B.

Next, actions of the above water heater WH will be described.

Figure 4A:
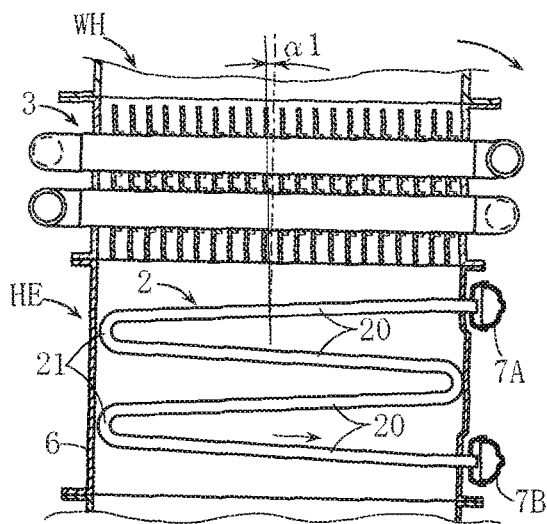
FIGS. 4A and 4B are sectional views showing main parts of a state in which the heat exchanger shown in FIGS. 1A, 1B, and 2 is tilted forward.
Figure 4B:
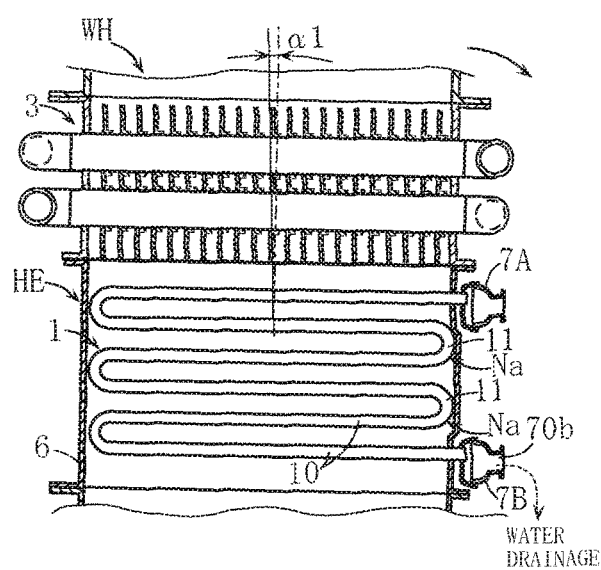

First, a case in which the water heater WH is disposed so as to be tilted forward by an appropriate tilt angle α1, as shown in FIGS. 4A and 4B, will be described. In this case, when an attempt is made to perform an operation to drain water from the first and second heat transfer tubes 1 and 2 with the water inlet header portion 7B in an open state, water remains in and around locations of the first heat transfer tube 1 indicated by a symbol Na in FIG. 4B. In the second heat transfer tube 2, on the other hand, as long as the tilt angle α1 remains at or below the tilt angle θ of the tilted straight tube body portion 20, it is possible to drain substantially all of the water in the second heat transfer tube 2 so that the water flows toward the header portion 7A side, thereby ensuring that no water remains in the interior thereof.

Figure 5A:
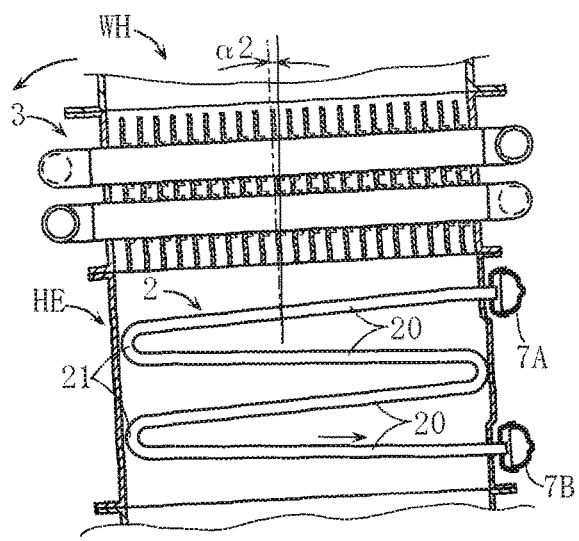
FIGS. 5A and 5B are sectional views showing main parts of a state in which the heat exchanger shown in FIGS. 1A, 1B, and 2 is tilted backward.
Figure 5B:
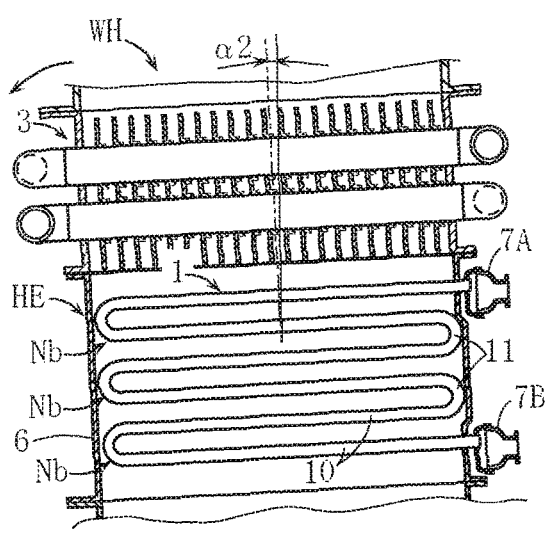

Conversely, the water heater WH may be disposed so as to be tilted backward by an appropriate tilt angle α2, as shown in FIGS. 5A and 5B. During the water drainage operation performed in this case, water remains in and around locations of the first heat transfer tube 1 indicated by a symbol Nb in FIG. 5B. In the second heat transfer tube 2, on the other hand, as long as the tilt angle α2 remains at or below the tilt angle θ, the water can be drained appropriately so that no water remains in the interior thereof.

Hence, even when a phenomenon whereby water freezes in the first heat transfer tubes 1 in winter occurs, freezing can be prevented from occurring in the second heat transfer tubes 2. Therefore, when a hot water supply terminal serving as the hot water supply destination of the water heater WH is opened, a flow of water is generated in the second heat transfer tubes 2 even if a flow of water is not generated in the first heat transfer tubes 1. Accordingly, the burner 4 can be driven to commence combustion, and as a result, a hot water supply operation can be started appropriately. When the burner 4 is driven to commence combustion, freezing of the first heat transfer tubes 1 is rapidly eliminated, making it possible to shift quickly to a normal hot water supply operation also using the first heat transfer tubes 1. With the water heater WH according to this embodiment, therefore, a trouble in which hot water supply becomes difficult due to freezing of the first heat transfer tubes 1 can be avoided appropriately.

During hot water supply, as latent heat is recovered from combustion gas by the secondary heat exchanger HE, drainage (condensed water) forms on/adheres to the surfaces of the first and second heat transfer tubes 1 and 2. Most of this drainage either drops off the first and second heat transfer tubes 1 and 2 as is or flows downward along the surfaces thereof. Here, as indicated by drainage D in FIG. 3, the drainage may enter the gap C between the second heat transfer tube 2 and the side wall portion 60 of the case 6. As described above, however, the second heat transfer tube 2 is tilted over the entire length of the intermediate region S excluding the respective end portions 2a, 2b, and therefore, as shown in FIG. 1A, the drainage D flows smoothly along the surface of the second heat transfer tube 2. Hence, a situation in which the drainage D that enters the gap C remains therein can also be avoided appropriately.

The pair of second heat transfer tubes 2 are disposed apart from each other on the left and right sides when the secondary heat exchanger HE is seen from the front, and the respective end portions 2b thereof are connected to the left and right sides of the water inlet 70b of the header portion 7B. Therefore, even if the secondary heat exchanger HE is disposed so as to be tilted in the left-right width direction, water can be drained appropriately toward the header portion 7B side from one second heat transfer tube 2 that is disposed above the water inlet 70b, among the pair of second heat transfer tubes 2, and as a result, an advantage is obtained in that appropriate water drainage can be realized reliably.

FIGS. 6A to 8 show other embodiments of the present invention. In these figures, elements that are identical or similar to those of the embodiment described above have been allocated identical reference symbols to the above embodiment, and duplicate description thereof has been omitted.

Figure 6A:
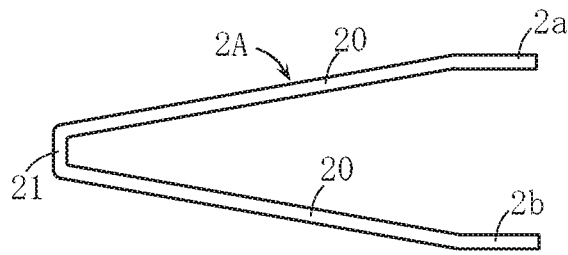
FIGS. 6A to 6C are side views showing main parts of another example of the present invention.

A second heat transfer tube 2A shown in FIG. 6A is formed in a sideways V shape so that only two tilted straight tube body portions 20 separated from each other in the up-down direction are provided. Further, the connecting tube body portion 21 connecting the two tilted straight tube body portions 20 is constituted by a short-sized straight tube body portion arranged in an upright attitude in the up-down height direction.

Likewise in this embodiment, water can be drained appropriately from the second heat transfer tube 2A, and therefore similar effects to the above embodiment are obtained. Here, the connecting tube body portion 21 according to this embodiment is formed from a straight tube body portion, and this part is not tilted. However, the "tilted tube body portion" of the second heat transfer tube according to the present invention may include a non-tilted part of this type (a part oriented upright in the up-down height direction).

Figure 6B:
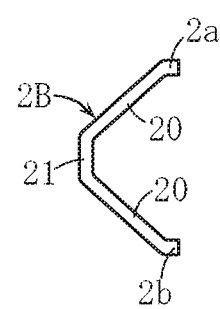

In a second heat transfer tube 2B shown in FIG. 6B, the tilted straight tube body portions 20 are shortened.

Although the second heat transfer tube 2B is preferably formed to be long in order to increase the amount of recovered heat, the second heat transfer tube 2B may be shortened, as in this embodiment. In this case, the manufacturing cost of the second heat transfer tube 2B can be reduced.

Figure 6C:
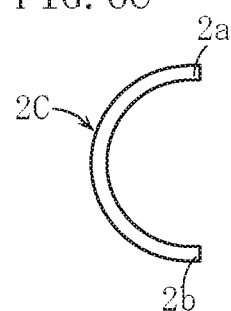

A second heat transfer tube 2C shown in FIG. 6C has a curved shape when seen from the side over the entirety thereof, except for the respective end portions 2a, 2b. This configuration may also be employed in the present invention.

Figure 7:
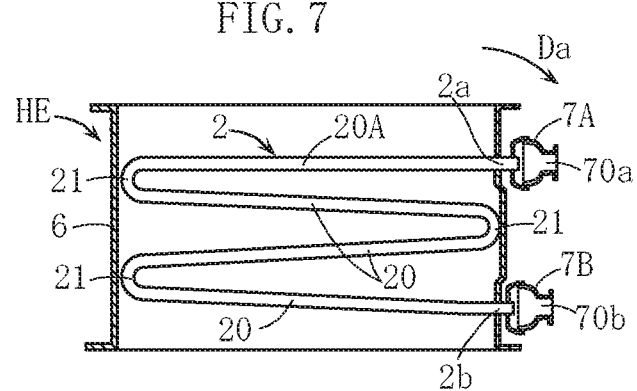
FIG. 7 is a sectional view showing main parts of another example of the present invention.

In an embodiment of the second heat transfer tube 2 shown in FIG. 7, a straight tube body portion 20A (a region of an uppermost portion) adjacent to the upper side end portion 2a is horizontal. Apart from this portion, the straight tube body portions are constituted by the tilted straight tube body portions 20.

In this embodiment, when the heat exchanger HE is mounted so as to be tilted forward, as indicated by an arrow Da, water in the straight tube body portion 20A can be caused to flow into the header portion 7A so as not to remain in the interior thereof. Further, contrary to the above, when the heat exchanger HE is mounted so as to be tilted backward, the water in the straight tube body portion 20A flows appropriately to a downstream side part of the straight tube body portion 20A.

As is evident from the above description, in the present invention, the region of the uppermost portion of the second heat transfer tube 2, adjacent to the upper side end portion 2a, can be formed in a horizontal shape.

Furthermore, as is evident from the embodiments shown in FIGS. 6A to 7, various modifications can be applied to the specific shape, size, and so on of the second heat transfer tube.

Figure 8:
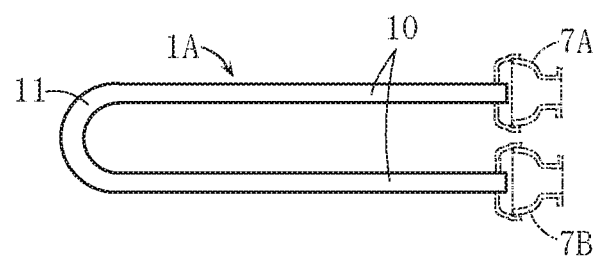
FIG. 8 is a side view showing another example of the present invention.

A first heat transfer tube 1A shown in FIG. 8 is formed in a U shape in which two straight tube body portions 10 on the upper and lower sides are connected via a single first connecting tube body portion 11. The first heat transfer tube according to the present invention may also be configured thus.

The present invention is not limited to the content of the embodiment described above, and the specific configurations of the respective parts of the heat exchanger and water heater according to the present invention may be freely subjected to various design modifications within the intended scope of the present invention.

In the above embodiment, a reverse combustion system in which the burner is disposed on the upper side of the heat exchanger is employed, but the present invention is not limited thereto, and instead, for example, a normal combustion system in which the burner is disposed on the lower side of the heat exchanger such that combustion gas advances upward may be employed. There are no limitations on the type of the burner, and an oil burner, for example, may be used. The water heater according to the present invention is any device having a hot water generation function, such as a general hot water supply device, a bath hot water supply device, a hot water air heating device, or a snow melting device, and the specific application thereof is not limited.

The heat exchanger according to the present invention is not limited to a heat exchanger that recovers latent heat. The heating gas is not limited to combustion gas, and high-temperature exhaust gas discharged from a cogeneration system, for example, may be used instead.

The invention claimed is:

1. A heat exchanger, comprising:
a case into which heating gas is supplied;
a plurality of serpentine or U-shaped first heat transfer tubes disposed in the case and formed by connecting a plurality of straight tube body portions that are arranged at intervals in an up-down height direction so as to extend in a horizontal direction in series via at least one first connecting tube body portion;
upper side and lower side header portions connected to respective upper and lower end portions of the plurality of first heat transfer tubes in a manner capable of charging water into and discharging hot water from the plurality of first heat transfer tubes; and
a second heat transfer tube disposed in the case so that upper side and lower side end portions thereof are connected respectively to the upper side and lower side header portions and configured such that an intermediate region excluding at least the respective end portions and a region of an uppermost portion that is adjacent to the upper side end portion is constituted by a tube body portion that are tilted over the entire length thereof so as to gradually decrease in height from one end side toward another end side of the intermediate region; wherein
the plurality of straight tube body portions of each of the first heat transfer tubes are arranged parallel to each other and extend in the horizontal direction;
the second heat transfer tube includes a plurality of straight tube body portions; and
an amount of the straight tube body portions of each of the first heat transfer tubes is larger than an amount of the straight tube body portions of the second heat transfer tube.

2. The heat exchanger according to claim 1, wherein the second heat transfer tube is formed in a serpentine shape or a sideways V shape in which a plurality of tilted straight tube body portions that are arranged at intervals in the up-down height direction and tilted in the up-down height direction are connected in series via at least one second connecting tube body portion.

3. The heat exchanger according to claim 2, wherein the second connecting tube body portion is either a bent tube body portion bent into an arc shape or a straight tube body portion that stands upright in the up-down height direction.

4. The heat exchanger according to claim 1, wherein the second heat transfer tube is shaped such that a region thereof excluding the respective end portions is entirely curved.

5. The heat exchanger according to claim 1, wherein the respective end portions of the second heat transfer tube are horizontal.

6. The heat exchanger according to claim 1, wherein the second heat transfer tube is vertically symmetrical.

7. The heat exchanger according to claim 1, wherein the case includes a pair of side wall portions positioned on respective sides of the plurality of first heat transfer tubes, and
a pair of second heat transfer tubes, each of which is positioned between one of the pair of side wall portions and the plurality of first heat transfer tubes, are provided as the second heat transfer tube.

8. A water heater, comprising:
the heat exchanger according to claim 1.

9. The water heater according to claim 8, further comprising:
a burner that supplies combustion gas into the case of the heat exchanger,
wherein the combustion gas serves as the heating gas.

* * * * *